(12) United States Patent
El-Massry

(10) Patent No.: US 7,791,465 B1
(45) Date of Patent: Sep. 7, 2010

(54) GRAPHICAL TAILLIGHT SYSTEM

(76) Inventor: Amr S. El-Massry, 10 Wasif Semeika Street, Fleming, Alexandria 21311 (EG)

( * ) Notice: Subject to any disclaimer, the term of this patent is extended or adjusted under 35 U.S.C. 154(b) by 267 days.

(21) Appl. No.: 12/024,137

(22) Filed: Feb. 1, 2008

(51) Int. Cl.
*B60Q 1/44* (2006.01)
(52) U.S. Cl. ........................ 340/478; 340/465; 307/10.1
(58) Field of Classification Search ................ 340/463, 340/464, 479, 466, 467, 468, 469, 471, 472, 340/441, 478, 465; 362/545; 307/10.1
See application file for complete search history.

(56) References Cited

U.S. PATENT DOCUMENTS

| 2,134,313 | A | * | 10/1938 | Nordgran | 362/351 |
| 4,387,361 | A | | 6/1983 | Reed | |
| 4,556,862 | A | * | 12/1985 | Meinershagen | 340/478 |
| 4,808,968 | A | | 2/1989 | Caine | |
| 4,854,808 | A | | 8/1989 | Bisiach | |
| 4,868,719 | A | | 9/1989 | Kouchi et al. | |
| 4,954,808 | A | | 9/1990 | Duerkob | |
| 5,003,289 | A | | 3/1991 | Roman | |
| 5,086,289 | A | | 2/1992 | Sullivan et al. | |
| 5,157,382 | A | * | 10/1992 | Stopa | 340/475 |
| 5,652,565 | A | * | 7/1997 | Salcedas et al. | 340/479 |
| 5,680,100 | A | | 10/1997 | Millsap | |
| 5,900,813 | A | | 5/1999 | Ruminski et al. | |
| 6,264,353 | B1 | | 7/2001 | Caraher et al. | |
| 6,382,821 | B1 | | 5/2002 | Heyer et al. | |
| 6,952,162 | B2 | | 10/2005 | Monck et al. | |
| 7,119,672 | B2 | * | 10/2006 | Subbaraman | 340/465 |
| 2002/0008617 | A1 | * | 1/2002 | Lee | 340/468 |
| 2006/0133103 | A1 | * | 6/2006 | Muhlbaier et al. | 362/545 |
| 2006/0267752 | A1 | * | 11/2006 | Crunk | 340/479 |

OTHER PUBLICATIONS

Arizona Department of Transportation, Perdestrian Signals—Are They Guarantees of Safety?, Feb. 2007.*
The U-Turn Signal, 2001, 6 pgs.

* cited by examiner

*Primary Examiner*—Benjamin C Lee
*Assistant Examiner*—Quang Pham

(57) ABSTRACT

A graphical taillight system for efficiently alerting a driver of a vehicle behind a signaling vehicle of the operations (e.g. braking, turning, reversing, etc.) of the signaling vehicle. The graphical taillight system generally includes a tail light cover including a rear surface, wherein the rear surface is comprised of a substantially nontransparent configuration. At least one signaling portion extends through the rear surface of the tail light cover, wherein the signaling portion is comprised of a substantially transparent configuration and wherein the signaling portion is graphically shaped to represent at least one operation of a vehicle. At least one light is aligned with the respective signaling portion, wherein the light shines through the signaling portion.

17 Claims, 7 Drawing Sheets

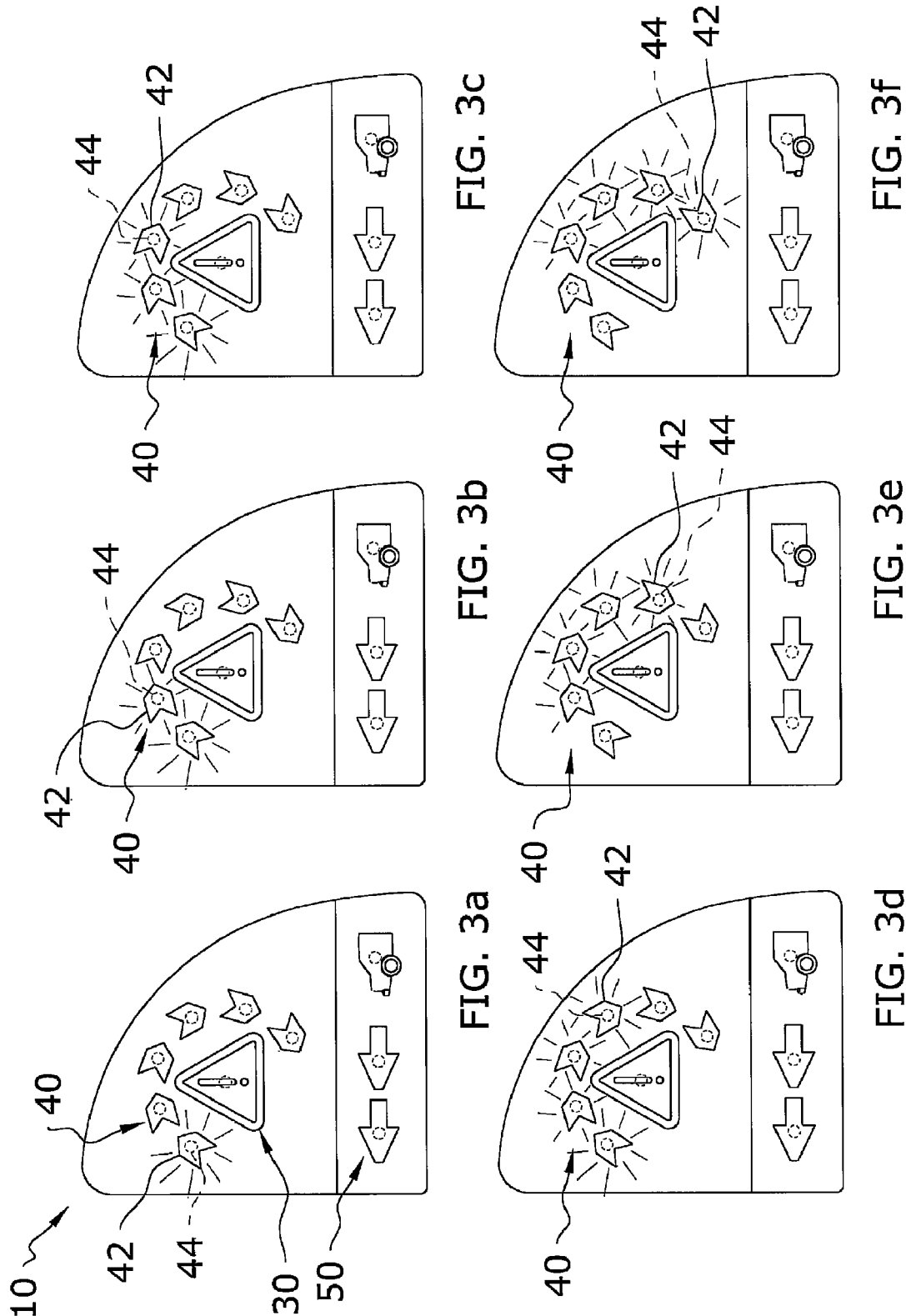

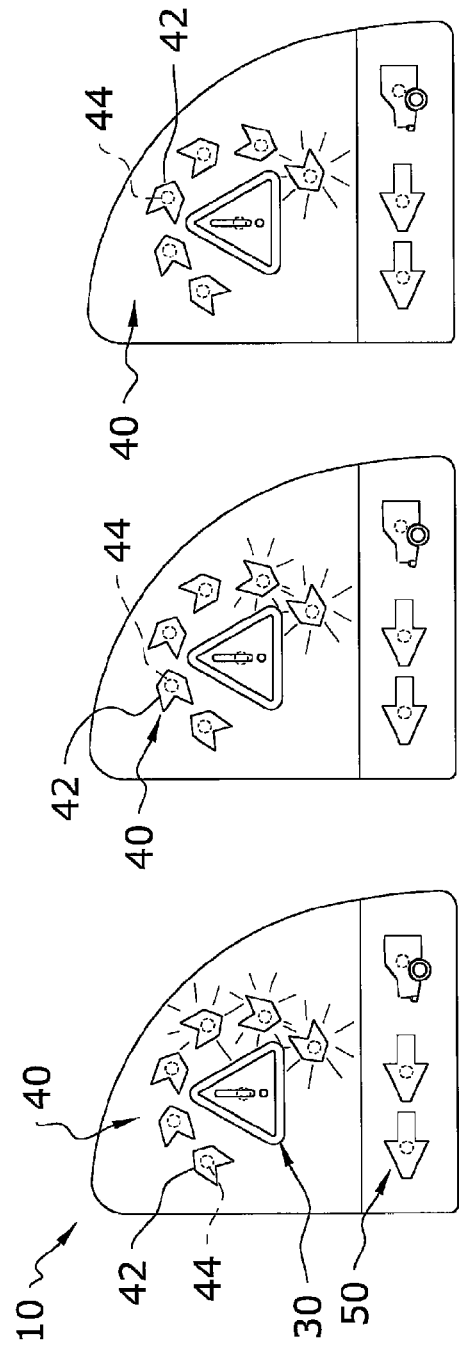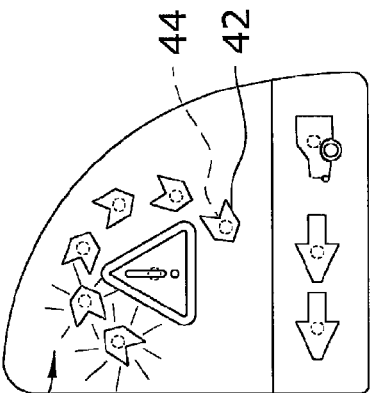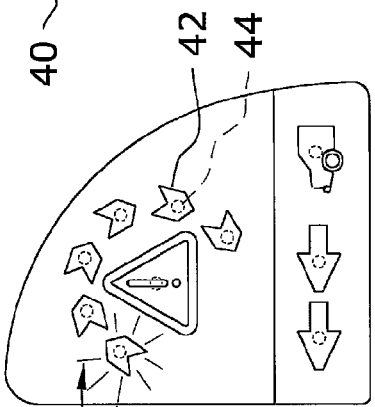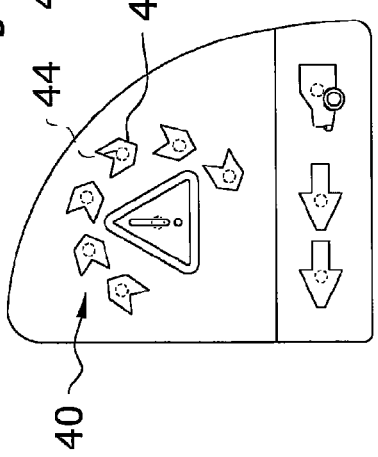
FIG. 3g  FIG. 3h  FIG. 3i
FIG. 3j  FIG. 3k  FIG. 3l

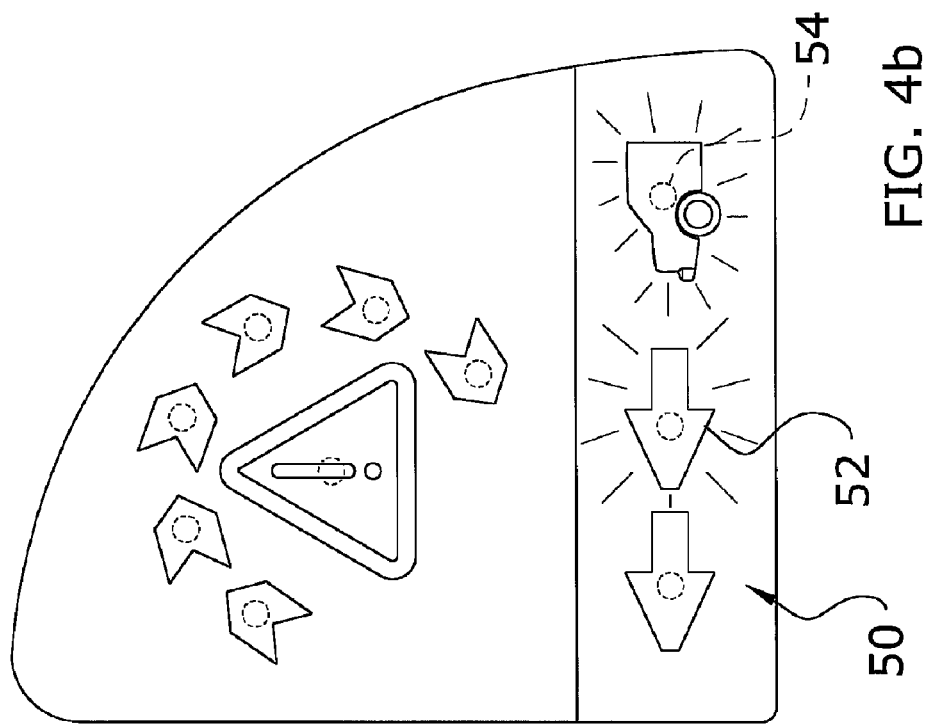
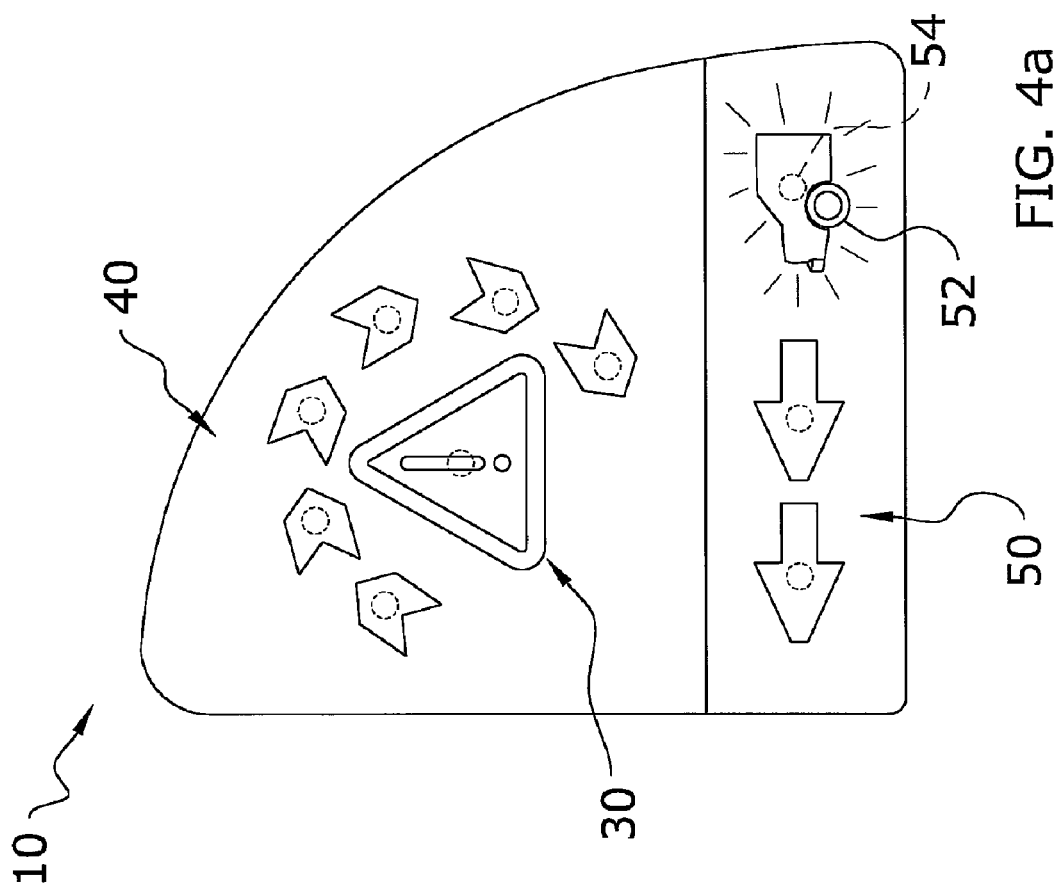
FIG. 4a
FIG. 4b

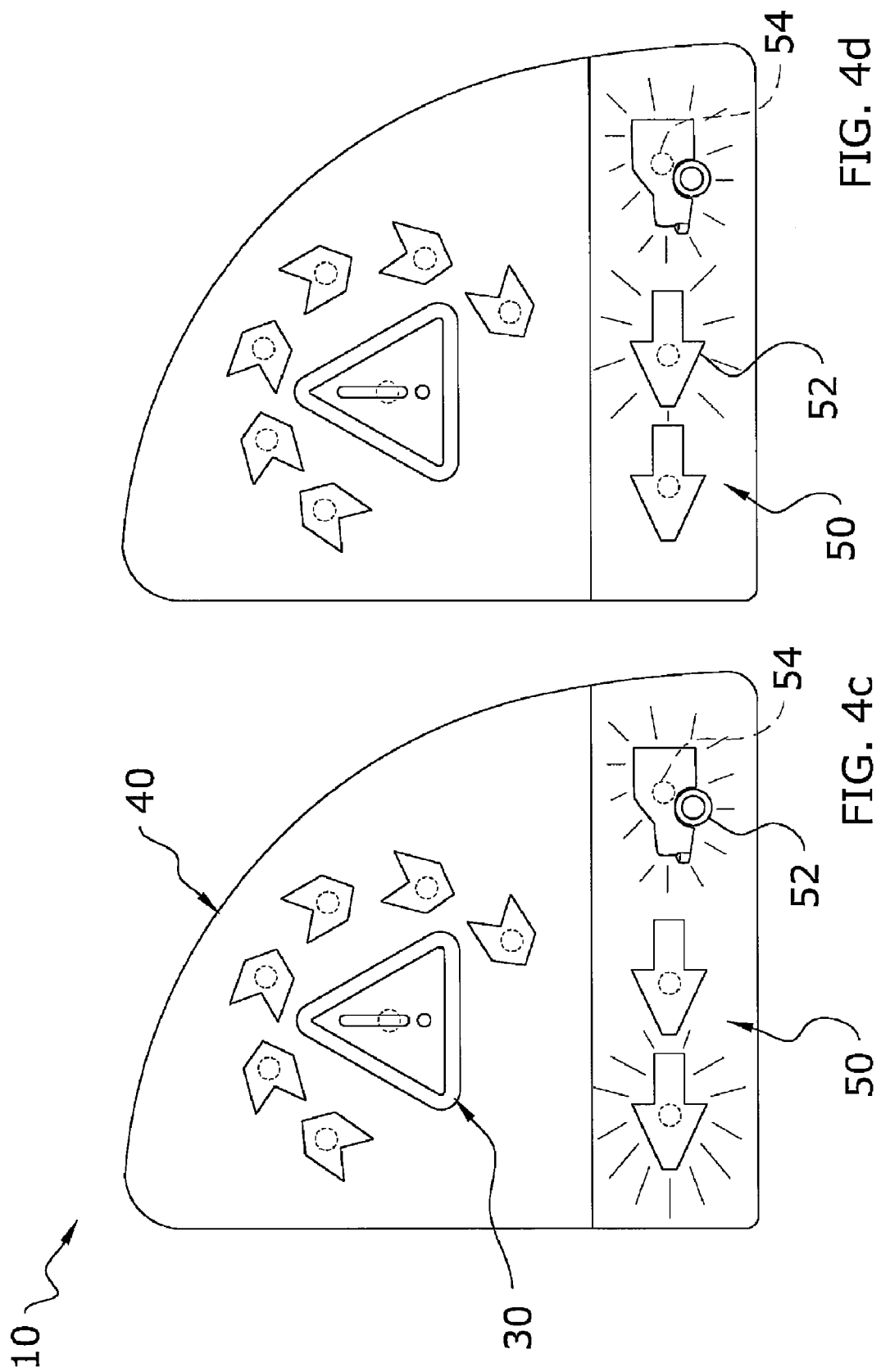

GRAPHICAL TAILLIGHT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicle taillights and more specifically it relates to a graphical taillight system for efficiently alerting a driver of a vehicle behind a signaling vehicle of the operations (e.g. braking, turning, reversing, etc.) of the signaling vehicle.

2. Description of the Related Art

Any discussion of the related art throughout the specification should in no way be considered as an admission that such related art is widely known or forms part of common general knowledge in the field.

Taillights have been in use for years with vehicles. Taillights are utilized to alert a driver of a vehicle behind the signaling vehicle (i.e. vehicle whose taillights are being viewed and operated) of various signaling vehicle operations, such as but not limited to braking of the signaling vehicle (i.e. slowing down), turning of the signaling vehicle or reversing of the vehicle.

It may be difficult to decipher what operation (i.e. braking or signaling) the signaling vehicle is making or planning on making at times. This can lead to accidents and generally decrease the level of safety on highways and roads with multiple traveling vehicles. Because of the inherent problems with the related art, there is a need for a new and improved graphical taillight system for efficiently alerting a driver of a vehicle behind a signaling vehicle of the operations (e.g. braking, turning, reversing, etc.) of the signaling vehicle.

BRIEF SUMMARY OF THE INVENTION

The general purpose of the present invention is to provide a graphical taillight system that has many of the advantages of the vehicle taillights mentioned heretofore. The invention generally relates to a vehicle taillight which includes a tail light cover including a rear surface, wherein the rear surface is comprised of a substantially nontransparent configuration. At least one signaling portion extends through the rear surface of the tail light cover, wherein the signaling portion is comprised of a substantially transparent configuration and wherein the signaling portion is graphically shaped to represent at least one operation of a vehicle. At least one light is aligned with the respective signaling portion, wherein the light shines through the signaling portion.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a graphical taillight system for efficiently alerting a driver of a vehicle behind a signaling vehicle of the operations (e.g. braking, turning, reversing, etc.) of the signaling vehicle.

Another object is to provide a graphical taillight system that may be easily installed upon various types of new and existing (i.e. previously manufactured) vehicles.

An additional object is to provide a graphical taillight system that may be manufactured in various shapes and sizes.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3a-3l illustrate the turning signal portion of the present invention in use, wherein the turning signal lights illuminate in a continuous and sequential manner (i.e. FIG. 3a-3j illustrate the sequence of the lights of the turning signal portion, and 3k and 3l illustrate the beginning of the process repeating.

FIG. 4a-4d illustrate the reversing signal portion of the present invention in use, wherein the reversing signal lights illuminate in a continuous and sequential manner (i.e. FIG. 4a-4c illustrate the sequence of the lights of the reversing signal portion, and 4d illustrate the process repeating.

DETAILED DESCRIPTION OF THE INVENTION

A. Overview

Figure 1:
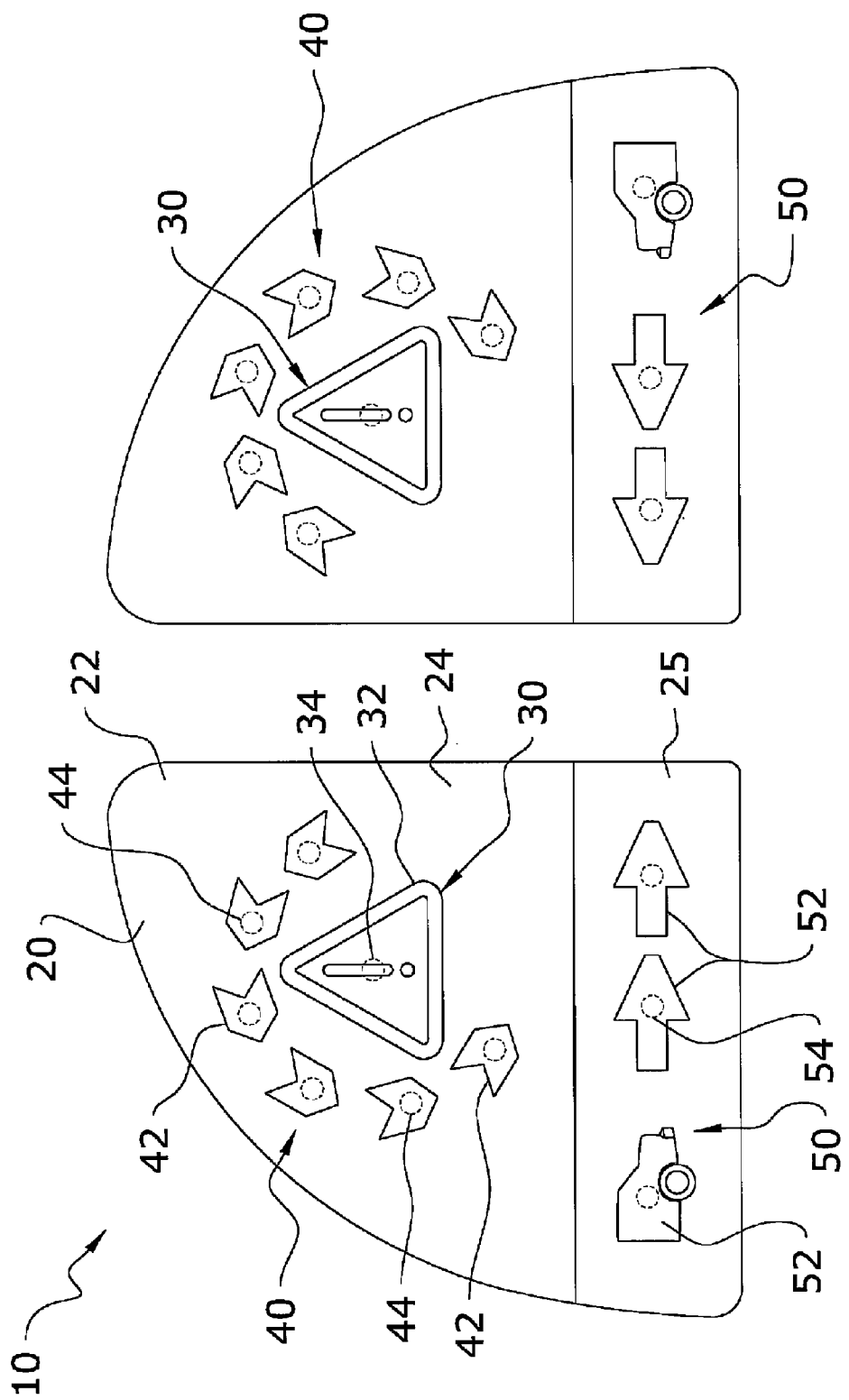
FIG. 1 is a rear view of the present invention.

Turning now descriptively to the drawings, in which similar reference characters denote similar elements throughout the several views, FIGS. 1 through 5 illustrate a graphical taillight system 10, which comprises a tail light cover 20 including a rear surface 22, wherein the rear surface 22 is comprised of a substantially nontransparent configuration. At least one signaling portion 30, 40, 50 extends through the rear surface 22 of the tail light cover 20, wherein the signaling portion 30, 40, 50 is comprised of a substantially transparent configuration and wherein the signaling portion 30, 40, 50 is graphically shaped to represent at least one operation of a vehicle 12. At least one light 34, 44, 54 is aligned with the respective signaling portion 30, 40, 50, wherein the light 34, 44, 54 shines through the signaling portion 30, 40, 50.

B. Cover

The cover 20 for the present invention may be comprised of various shapes and various sizes to attach to the portion of the vehicle 12 utilized to secure commonly utilized tail light covers 20. The cover 20 may install in place of the existing tail light cover or install over the existing tail light cover so the driver of the vehicle behind a signaling vehicle 12 views the cover 20. The cover 20 may be comprised of various materials (e.g. plastic, etc.) able to withstand various weather elements or other elements common with tail light covers.

The cover 20 may also include various brackets or connecting structures to attach to the vehicle 12. The cover 20 may also be comprised of various colors (e.g. red, clear, etc.). The rear surface 22 (i.e. viewable surface by driver behind signaling vehicle 12) is preferably comprised of a nontransparent material so as to prevent the various lights 34, 44, 54 of the present invention from shining through portions of the rear surface 22 not including the first indicator 32, second indicator 42 or third indicator 52. Providing a nontransparent or translucent material upon the rear surface 22 further helps to direct the glow of the lights 34, 44, 54 through the respective signaling portions 30, 40, 50.

The rear surface 22 also includes an upper portion 24 and a lower portion 25. The upper portion 24 and the lower portion 25 each preferably include a respective signaling portion(s) 30, 40, 50. The cover 20 preferably includes a first signaling portion 30, a second signaling portion 40 and a third signaling portion 50 to each represent a desired operation of the signaling vehicle 12, such as braking, turning or reversing. It is appreciated that the present invention may include more or less signaling portions to represent various other operations rather than those described.

C. First Signaling Portion

The first signaling portion 30 represents the braking operation of the vehicle 12. The first signaling portion 30 is preferably centrally positioned upon the upper portion 24 of the cover 20. The first signaling portion 30 may be comprised of various shapes and, sizes all which are easily decipherable by the operator of the vehicle behind the signaling vehicle 12 to indicate that the signaling vehicle 12 is braking or stopped.

Figure 2:
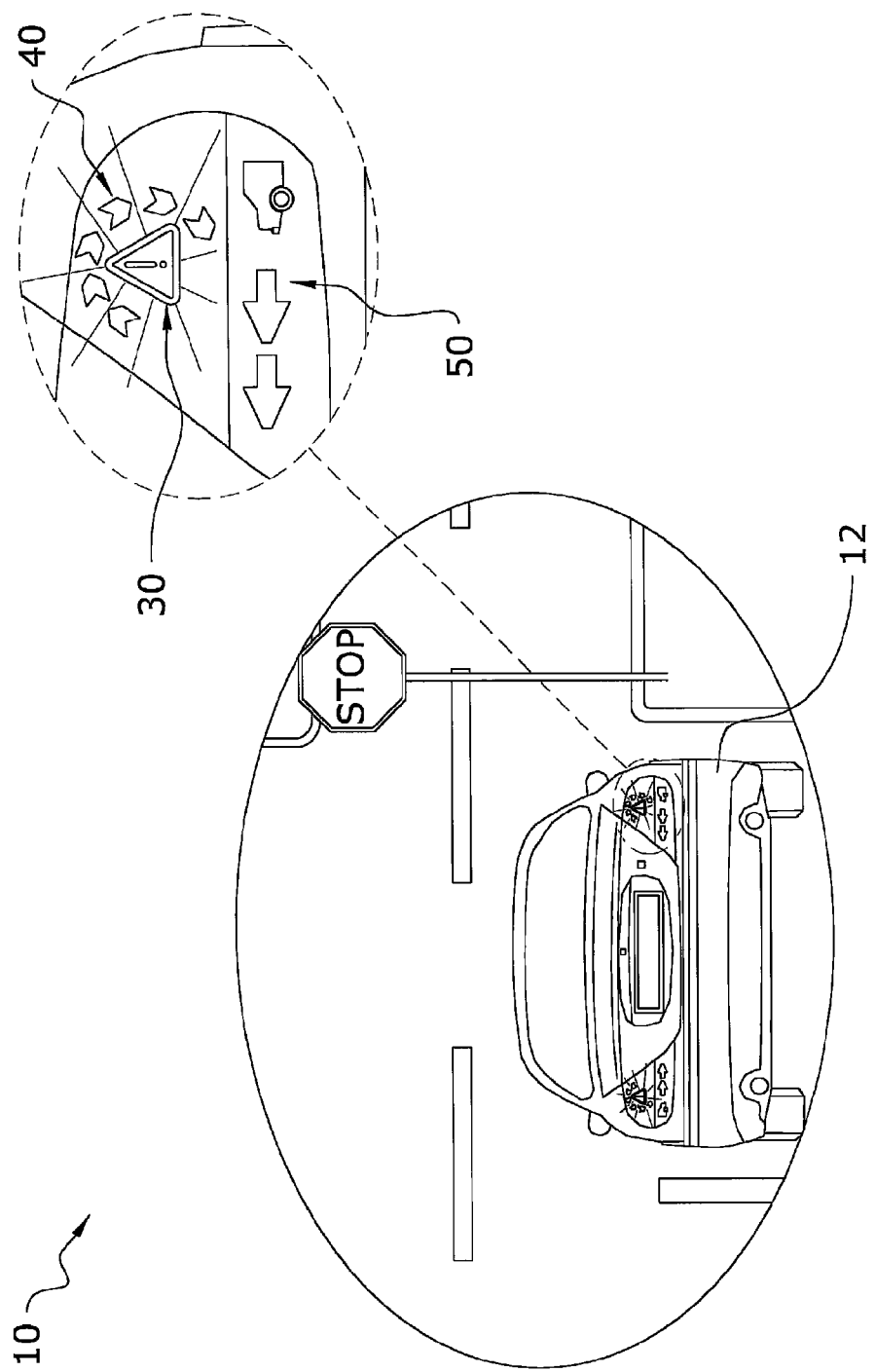
FIG. 2 is an illustration of the present invention attached to a vehicle an in use, wherein the braking signaling portion of the present invention is in use.

It is appreciated that the first signaling portion 30 is preferably located on each of the covers 20 upon the opposing sides of the vehicle 12 as illustrated in FIG. 2.

The first signaling portions 30 further preferably mirror each other. The first signaling portion 30 includes at least one first indicator 32 and at least one first lighting unit 34. The first lighting unit 34 may be comprised of various devices capable of emitting light, such as but not limited to an LED or various types of bulbs. It is appreciated that the first indicator 32 and the first light 34 may be integrally formed, the first light 34 may be positioned in front of the rear surface 22 (between the rear surface 22 and the vehicle 12) or various other arrangements all so that the first indicator 32 is lit up when applying the brakes of the vehicle 12 or when the vehicle 12 is stopped. The first indicator 32 may also include a compartment to house the first light 34.

The first indicator 32 may further be comprised of a clear shaped translucent or transparent, colored shaped transparent or translucent or a shaped opening cut out of the rear surface 22 so as to view the first light 34, wherein the first light 34 may be colored. In the preferred embodiment, the first indicator 32 is comprised of a red colored transparent configuration.

The first indicator 32 may further be comprised of various shapes and sizes. Various embodiments are illustrated in FIGS. 1 through 5 depicting different shapes (i.e. triangular border with exclamation point symbol within similar to a warning sign in FIGS. 1 through 4, vertical hand in FIG. 5) of the first indicator 32. When applying the brakes or stopped within the signaling vehicle 12 the first light 34 may function in various manners, such as providing a constant illumination or blinking.

D. Second Signaling Portion

The second signaling portion 40 represents the turning operation of the vehicle 12. The second signaling portion 40 is preferably centrally positioned upon the upper portion 24 of the cover 20 and further preferably partially circles around the first signaling portion 30 as illustrated in FIGS. 1 through 5. The second signaling portion 40 may be comprised of various shapes and sizes all which are easily decipherable by the operator of the vehicle behind the signaling vehicle 12 to indicate that the signaling vehicle 12 is turning or planning on turning.

It is appreciated that the second signaling portion 40 is preferably located on each of the covers 20 upon the opposing sides of the vehicle 12 as illustrated in FIG. 2. The second signaling portions 40 further preferably mirror each other.

The second signaling portion 40 includes at least one second indicator 42 and at least one second lighting unit 44. The second lighting unit 44 may be comprised of various devices capable of emitting light, such as but not limited to a plurality of LEDs or various types of bulbs. It is appreciated that the second indicator 42 and the second light 44 may be integrally formed, the second light 44 may be positioned in front of the rear surface 22 (between the rear surface 22 and the vehicle 12) or various other arrangements all so that the second indicator 42 is lit up when the signaling vehicle 12 is turning or signaling to turn. The second indicator 42 may also include a compartment to house the second light 44.

The second indicator 42 may further be comprised of a clear shaped translucent or transparent, colored shaped transparent or translucent or a shaped opening cut out of the rear surface 22 so as to view the second light 44, wherein the second light 44 may be colored. In the preferred embodiment, the second indicator 42 is comprised of a yellow colored transparent configuration.

Figure 5:
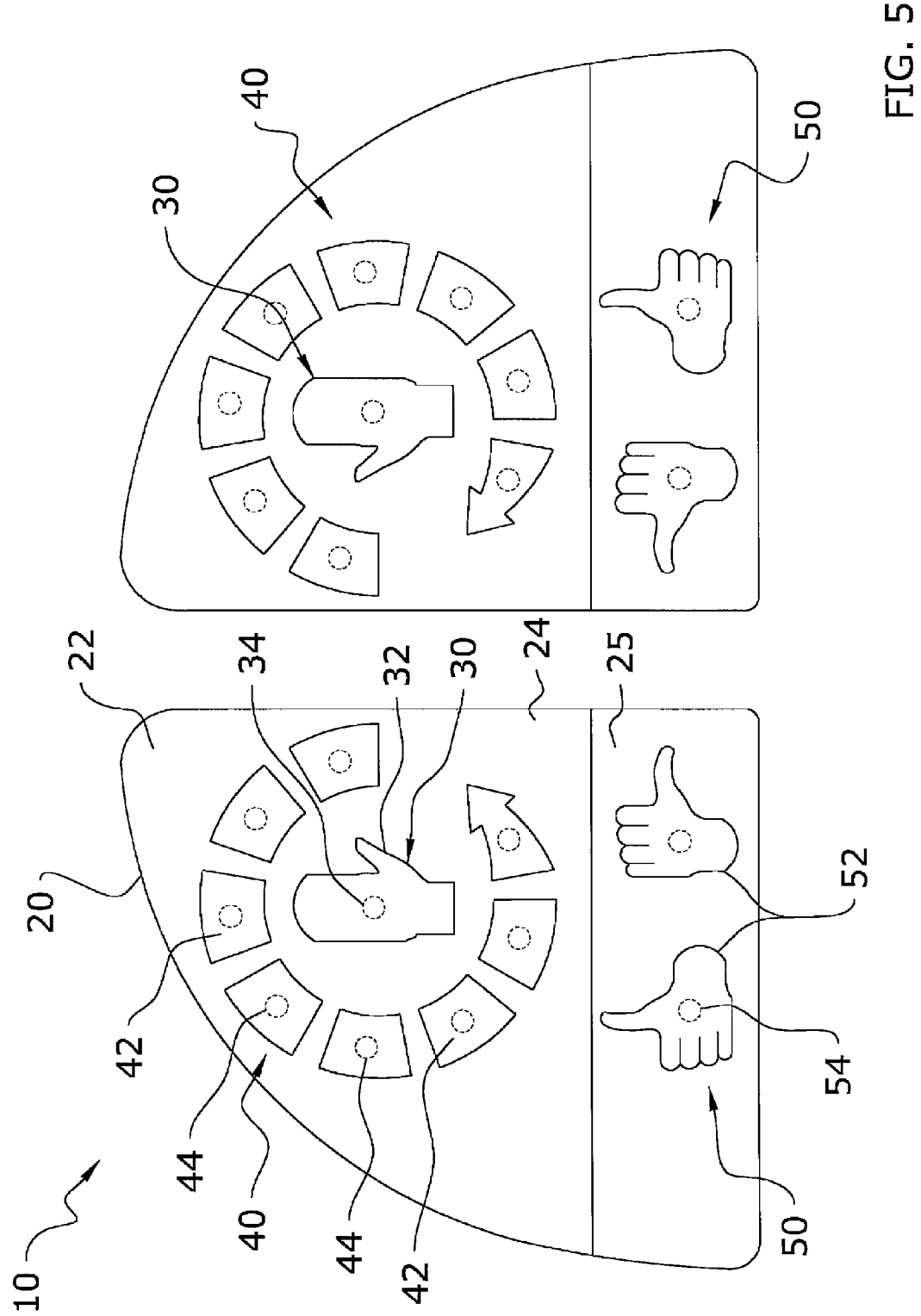
FIG. 5 is a rear view of an alternate embodiment of the present invention.

The second indicator 42 may further be comprised of various shapes and sizes. Various embodiments are illustrated in FIGS. 1 through 5 depicting different shapes (i.e. a plurality of arrows encircling the first indicator 32 as illustrated in FIGS. 1 through 4, a broken leader encircling the first indicator 32 as illustrated in FIG. 5) of the second indicator 42.

When turning or signaling to turn with the signaling vehicle 12 the second light 44 may function in various manners, such as providing a constant illumination or blinking. In the preferred embodiment, a plurality of second lights 44 each positioned behind a respective second indicator 42 flash one after another, shining through each successive second indicator 42, toward the end of the second signaling portion 40 (i.e. outer tip of the arrow) in a sequential and continuous (i.e. keep going around and around) manner. In the preferred embodiment, the first in-line second indicator 42 won't start to dim until the fourth in-line second indicator 42 starts to light. Likewise, the second in-line second indicator 42 won't start to dim until the fifth in-line second indicator 42 starts to light.

When all the lights 44 of the second indicators 42 are dim, the cycle will pause for a short duration (e.g. 2 seconds, etc.) before restarting.

E. Third Signaling Portion

The third signaling portion 50 represents the reversing operation of the vehicle 12. The third signaling portion 50 is preferably centrally positioned upon the lower portion 25 of the cover 20 as illustrated in FIGS. 1 through 5. The third signaling portion 50 may be comprised of various shapes and sizes all which are easily decipherable by the operator of the vehicle behind the signaling vehicle 12 to indicate that the signaling vehicle 12 is reversing or planning on reversing.

It is appreciated that the third signaling portion 50 is preferably located on each of the covers 20 upon the opposing sides of the vehicle 12 as illustrated in FIG. 2. The third signaling portions 50 further preferably mirror each other.

The third signaling portion 50 includes at least one third indicator 52 and at least one third lighting unit 54. The third lighting unit 54 may be comprised of various devices capable of emitting light, such as but not limited to a plurality of LEDs or various types of bulbs. It is appreciated that the third indicator 52 and the third light 54 may be integrally formed, the third light 54 may be positioned in front of the rear surface 22 (between the rear surface 22 and the vehicle 12) or various other arrangements all so that the third indicator 52 is lit up when the signaling vehicle 12 is reversing or signaling to reverse. The third indicator 52 may also include a compartment to house the third light 54.

The third indicator 52 may further be comprised of a clear shaped translucent or transparent, colored shaped transparent or translucent or a shaped opening cut out of the rear surface 22 so as to view the third light 54, wherein the third light 54 may be colored. In the preferred embodiment, the third indicator 52 is comprised of an ice blue or white colored transparent configuration.

The third indicator 52 may further be comprised of various shapes and sizes. Various embodiments are illustrated in FIGS. 1 through 5 depicting different shapes (i.e. a plurality of arrows extending from the rear end of a vehicle 12 as illustrated in FIGS. 1 through 4, a rotating hand as illustrated in FIG. 5) of the third indicator 52.

When reversing or signaling to reverse with the signaling vehicle 12 the third light 54 may function in various manners, such as providing a constant illumination or blinking. In the preferred embodiment, a plurality of third lights 54 each positioned behind a respective third indicator 52 flash one after another, shining through each successive third indicator 52, toward the end of the third signaling portion 50 (i.e. outer tip of the arrow, etc.) in a sequential and continuous manner. In the preferred embodiment the arrow configured third indicator 52 of the third signaling portion 50 blink back and forth (one lit when other is dim) while the vehicle configured third indicator 52 remains constantly lit.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:
1. A graphical taillight system, comprising:
a tail light cover including a rear surface, wherein said rear surface is comprised of a substantially nontransparent configuration; and
a first signaling portion extending through said rear surface of said tail light cover, wherein said first signaling portion is comprised of a substantially transparent configuration;
wherein said first signaling portion is graphically shaped to represent a braking operation of a vehicle;
at least one first light aligned with said first signaling portion, wherein said at least one first light shines through said first signaling portion;
wherein said first signaling portion is comprised of a shape of a warning sign;
a second signaling portion extending through said rear surface of said tail lighting unit cover, wherein said second signaling portion is comprised of a substantially transparent configuration;
wherein said second signaling portion is graphically shaped to represent a turning operation of a vehicle;
at least one second light aligned with said second signaling portion, wherein said at least one second light shines through said second signaling portion;
wherein said second signaling portion is comprised of a shape of an elongated broken arrow or a plurality of spaced arrows arranged in a circular manner;
a third signaling portion extending through said rear surface of said tail lighting unit cover, wherein said third signaling portion is comprised of a substantially transparent configuration; and
wherein said third signaling portion is graphically shaped to represent a reversing operation of a vehicle; and
at least one third light aligned with said third signaling portion, wherein said at least one third light shines through said third signaling portion;
wherein said first graphical shape of said first signaling portion, said second graphical shape of said second signaling portion, and said third graphical shape of said third signaling portion are each different in shape;
wherein a first portion of said third signaling portion is shaped of a pair of rotating hands or a pair of arrows lighting in an every other manner and wherein a second portion of said third signaling portion is shaped of a rear end of a vehicle remaining constantly lit.

2. The graphical taillight system of claim 1, wherein said at least one first light, said at least one second light, and said at least one third light each include a plurality of lights.

3. The graphical taillight system of claim 2, wherein said plurality of lights of said at least one second light flash one after another in a sequential manner.

4. The graphical taillight system of claim 3, wherein said plurality of lights of said at least one second light flash one after another in a continuous manner.

5. A graphical taillight system, comprising:
a tail light cover including a rear surface, wherein said rear surface is comprised of a substantially nontransparent configuration;
a first signaling portion extending through said rear surface of said tail lighting unit cover, wherein said first signaling portion is comprised of a substantially transparent configuration;
wherein said first signaling portion is comprised of a first graphical shape to represent a braking operation of a vehicle;

at least one first lighting unit aligned with said first signaling portion, wherein said at least one first lighting unit shines through said first signaling portion;

a second signaling portion extending through said rear surface of said tail lighting unit cover, wherein said second signaling portion is comprised of a substantially transparent configuration;

wherein said second signaling portion is comprised of a second graphical shape to represent a turning operation of the vehicle;

at least one second lighting unit aligned with said second signaling portion, wherein said at least one second lighting unit shines through said second signaling portion;

a third signaling portion extending through said rear surface of said tail lighting unit cover, wherein said third signaling portion is comprised of a substantially transparent configuration;

wherein said third signaling portion is comprised of a third graphical shape to represent a reversing operation of the vehicle; and at least one third lighting unit aligned with said third signaling portion, wherein said at least one third lighting unit shines through said third signaling portion;

wherein said first graphical shape is comprised of a shape of a warning sign having an exclamation point surrounded by a triangular structure;

wherein said second graphical shape is comprised of a shape of an elongated broken arrow or a plurality of spaced arrows arranged in a circular manner;

wherein a first portion of said third graphical shape is comprised of a shape of a pair of rotating hands or a pair of arrows lighting in an every other manner and wherein a second portion of said third graphical shape is shaped of a rear end of a vehicle remaining constantly lit.

6. The graphical taillight system of claim 5, wherein said at least one second lighting unit is comprised of a plurality of turning lights.

7. The graphical taillight system of claim 6, wherein said plurality of turning lights flash one after another in a sequential manner.

8. The graphical taillight system of claim 5, wherein said at least one third lighting unit is comprised of a plurality of reversing lights.

9. A method for conveying vehicle operations, comprising:
providing a tail light cover for a vehicle, said tail light cover being comprised of a non transparent configuration, and said tail light cover having;
a first signaling portion extending therethrough and comprised of a transparent warning sign shape;
a second signaling portion extending therethrough and comprised of a transparent first directional conveying shape; and
a third signaling portion extending therethrough and comprised of a transparent second directional conveying shape different than said first directional shape;
providing a plurality of lights aligned with said signaling portions;
illuminating a first portion of said plurality of lights when a braking operation of a vehicle is performed;
causing said first portion to illuminate said first signaling portion;
illuminating a second portion of said plurality of lights when a turning operation of a vehicle is performed;
causing said second portion to illuminate said second signaling portion;
illuminating a third portion of said plurality of lights when a reversing operation of a vehicle is performed; and
causing said third portion to illuminate said third signaling portion;
wherein said first directional conveying shape is comprised of a shape of an elongated broken arrow or a plurality of spaced arrows arranged in a circular manner;
wherein said second directional conveying shape is comprised of a first portion is a pair of spaced symbols lighting in an every other manner and a second portion in a shape of a rear end of a vehicle remaining constantly lit.

10. The method for conveying vehicle operations of claim 9, including the step of blinking said first portion of said plurality of lights when a braking operation is performed.

11. The method for conveying vehicle operations of claim 9, including the step of constantly illuminating said first portion of said plurality of lights when a braking operation is performed.

12. The method for conveying vehicle operations of claim 9, wherein said plurality of spaced arrows are each illuminated as a whole in a continuous and sequential manner.

13. The method for conveying vehicle operations of claim 12, including an illuminating process of said plurality of spaced arrows comprising:
illuminating a first sequential grouping of arrows in a sequential manner; then
illuminating a next arrow after said first sequential grouping of arrows; while
simultaneously causing a first arrow of said first sequential grouping of arrows to dim;
forming a second sequential grouping of arrowing with said next arrow and said first sequential grouping of arrows minus said first arrow;
continuing to form illuminated sequential grouping of arrows until a last arrow of said plurality of spaced arrows is illuminated; then
dimming a first arrow of a last said sequential grouping of arrows; then
continuing to sequentially dim arrows of said last sequential grouping of arrows until all arrows of said plurality of arrows are dim; then
restarting said illuminating process of said plurality of spaced arrows.

14. The method for conveying vehicle operations of claim 13, wherein each sequential grouping of arrows is comprised of at least three sequential arrows.

15. The method for conveying vehicle operations of claim 14, wherein each sequential grouping of arrows is comprised of at least four sequential arrows.

16. The method for conveying vehicle operations of claim 13, wherein said plurality of spaced arrows are arranged in a circular curved manner.

17. The method for conveying vehicle operations of claim 9, wherein said first signaling portion is comprised of a shape of warning sign having an exclamation point surrounded by a triangular structure.

* * * * *